United States Patent
Miyashita

(10) Patent No.: US 7,547,468 B2
(45) Date of Patent: Jun. 16, 2009

(54) OPTICAL FILM AND LIGHTING DEVICE USING THE OPTICAL FILM

(75) Inventor: Junji Miyashita, Fujiyoshida (JP)

(73) Assignee: Citizens Electronics Co., Ltd., Yamanashi-Ken (JP)

( * ) Notice: Subject to any disclaimer, the term of this patent is extended or adjusted under 35 U.S.C. 154(b) by 0 days.

(21) Appl. No.: 11/580,428

(22) Filed: Oct. 13, 2006

(65) Prior Publication Data

US 2007/0086210 A1    Apr. 19, 2007

(30) Foreign Application Priority Data

Oct. 15, 2005    (JP)    ............................. 2005-301081

(51) Int. Cl.
*G02F 1/335* (2006.01)

(52) U.S. Cl. ........................ 428/1.3; 428/1.33; 428/131; 428/134; 428/135

(58) Field of Classification Search ......... 362/600–631; 428/1.3–1.33
See application file for complete search history.

(56) References Cited

U.S. PATENT DOCUMENTS

| 6,818,261 | B2 * | 11/2004 | Kawabata | 428/1.3 |
| 6,846,089 | B2 * | 1/2005 | Stevenson et al. | 362/627 |
| 6,917,473 | B2 * | 7/2005 | Umemoto et al. | 359/599 |
| 7,227,685 | B2 * | 6/2007 | Umemoto et al. | 359/496 |
| 7,410,679 | B2 * | 8/2008 | Matsufuji | 428/1.3 |
| 2003/0184691 | A1 | 10/2003 | Miyashita | |

FOREIGN PATENT DOCUMENTS

JP    2002-042529    2/2002

* cited by examiner

*Primary Examiner*—Anabel M Ton
(74) *Attorney, Agent, or Firm*—Brinks Hofer Gilson & Lione

(57) ABSTRACT

An optical film for use in a side-light type lighting device of a liquid crystal display or the like includes a plurality of tilted column-shaped transparent film cells extending from a light entrance surface to a light exit surface of the optical film. Light-reflecting layers are provided on a part of side surfaces of each film cell. Light from an LED light source enters a light guide plate, exits the top surface of the light guide plate, and enters the film cells. The light is reflected by the light-reflecting layers of the cells to exit therefrom as directed light.

15 Claims, 9 Drawing Sheets

Radiation Angle θ (deg)

Radiation Angle θ (deg)

OPTICAL FILM AND LIGHTING DEVICE USING THE OPTICAL FILM

This application claims priority under 35 U.S.C. § 119 to Japanese Patent Application No. JP2005-301081 filed Oct. 15, 2005, the entire content of which is hereby incorporated by reference.

BACKGROUND OF THE INVENTION

1. Field of the Invention

The present invention relates to an optical film for use in small-sized displays of cellular phones, personal digital assistants (PDAs), etc. The present invention also relates to a lighting device using the optical film.

2. Description of the Related Arts

Recently, lighting devices incorporating light-emitting diodes (hereinafter abbreviated as "LEDs") as their light sources have begun to be used because LEDs have long service life and can easily take chromaticity control as compared to fluorescent display tubes.

FIGS. 8A to 8C show a conventional example in which a side-light type lighting device incorporating light-emitting diodes (LEDs) is used as a backlight. FIG. 8A is a plan view, and FIG. 8B is a side view. FIG. 8C is a sectional view showing the path of light in the lighting device.

In this lighting device, a plurality of LED light sources 44 are disposed at a side edge of a rectangular light guide plate 26 so that light emitted from the LED light sources 44 enters the light guide plate 26 through the side edge surface thereof. The light guide plate 26 has a plurality of reflecting prisms 70 formed on the bottom surface thereof, and each of the reflecting prisms extends parallel to the side edge at which the LEDs are disposed.

As shown in FIG. 8B, a reflecting sheet 48 is disposed under the bottom of the light guide plate 26, and a prism sheet 76 is disposed over the top surface of the light guide plate 26. These components of the lighting device are housed in a holder 42 to illuminate a non self-emission display 50 (see FIG. 8C), e.g. a liquid crystal display, which is placed directly above the holder 42.

FIG. 8C shows the behavior of light in the lighting device having the above-described structure. Light 78 emitted from the LED light sources 44 is propagated while repeating bouncing between the top surface of the light guide plate 26 and the surfaces of the reflecting prisms 70 provided on the bottom surface of the light guide plate 26. As the light 78 repeats bouncing or reflection, the incident angle of the light 78 on the top surface of the light guide plate 26 decreases and eventually becomes smaller than the critical angle. Consequently, light exits from the top surface of the light guide plate 26. Light 79 emitted through the bottom surface of the light guide plate 26 is reflected on the reflecting sheet 48 and returned to the light guide plate 26. The exiting light from the top surface of the light guide plate 26 is refracted by the prism sheet 76 and led to the display 50.

It should be noted that in the embodiments described below, the same members as those stated above are denoted by the same reference numerals.

There have been proposed many techniques wherein a light-refracting sheet such as a prism sheet or a lens sheet is placed over the above-described light guide plate 26 to illuminate a non self-emission display (for example, see Japanese Patent Application Publication No. 2002-42529).

In general, however, the light from the LED light sources 44 cannot be said to have high directivity, as shown in FIG. 8A. Accordingly, there are many light components 72 and 74 traveling in directions not perpendicular to the extending direction of the reflecting prisms 70. Such light is undesirably scattered when exiting the prism sheet 76, as indicated by reference numeral 80 in FIG. 8C. Consequently, there are many light components that are not substantially perpendicular to the light exit surface of the light guide plate 26. For this reason, the brightness of the lighting device cannot be high.

FIG. 9A is a graph showing optical characteristics of a conventional lighting device arranged as shown in FIGS. 8A to 8C. FIG. 9B is a view for explaining coordinate axes used in the specification of the present invention.

As shown in FIG. 9B, coordinate axes are defined as follows: an X axis extends in the width direction (i.e. the vertical direction as viewed in the figure) of the light exit surface of the light guide plate 26; a Z axis extends in the longitudinal direction (i.e. the horizontal direction as viewed in the figure) of the light exit surface of the light guide plate 26; and a Y axis is perpendicular to the X-Z plane.

FIG. 9A shows the directivity characteristics of the conventional lighting device graphed based on the coordinate axes defined as stated above.

As will be understood from the graph of FIG. 9A, the conventional lighting device has the following directivity characteristics. For example, in the X-Y plane, light in the angle direction of 30° from the direction perpendicular to the light exit surface of the light guide plate 26, i.e. the Y axis direction, has an about 40% intensity of light in the perpendicular direction (Y axis direction). In the Z-Y plane, light in the angle direction of 30° from the direction perpendicular to the light exit surface of the light guide plate 26, i.e. the Y axis direction, has an about 10% intensity of light in the perpendicular direction. That is, the directivity in the X-Y direction, which is the width direction, is particularly low. Thus, the conventional lighting device suffers from insufficient directivity of light and is consequently limited in brightness.

FIGS. 10A and 10B are reference drawings provided to explain optical characteristics of lighting devices, in which the same coordinate axes as those in FIG. 9A are used.

FIG. 10A shows optical characteristics of a lighting device having ideal directivity. Both the characteristics in the X-Y and Z-Y planes provide light only in the direction perpendicular to the light exit surface of the light guide plate, that is, in the direction of θ=0, as shown by solid line 86.

FIG. 10B shows optical characteristics of a lighting device having no directivity. Both the characteristics in the X-Y and Z-Y planes undesirably provide a constant light intensity (about 30% of the light intensity obtained with the above-described ideal directivity) at all angles to the light exit surface of the light guide plate, as shown by the thick solid line 88.

SUMMARY OF THE INVENTION

The present invention has been made in view of the above-described circumstances.

Accordingly, an object of the present invention is to increase the directivity of light applied to a display from a lighting device.

The present invention provides an optical film having a light entrance surface and a light exit surface that are opposite to each other. The optical film has a plurality of transparent film cells extending from the light entrance surface to the light exit surface. Light-reflecting layers are provided on at least a part of side surfaces of each film cell extending from the light entrance surface to the light exit surface.

Specifically, the optical film may be arranged as follows. A cross-sectional configuration of each film cell parallel to the light entrance surface and the light exit surface is selected from the group consisting of polygon, circle and ellipse, and the plurality of film cells are arranged to contact each other.

More specifically, the optical film may be arranged as follows. The light entrance surface and the light exit surface are parallel to each other, and the side surfaces of the plurality of film cells are tilted at a predetermined angle relative to the light entrance surface and the light exit surface.

In addition, the present invention provides a lighting device including a light guide plate having a reflecting surface and a light output surface that are opposite to each other and a peripheral edge surface extending between the respective peripheral edges of the reflecting surface and the light output surface. The peripheral edge surface includes a light input surface that receives light into the light guide plate so that the light bounces inside the light guide plate so that the light eventually exits from the light output surface. The lighting device further includes an optical film having a light entrance surface disposed adjacent to the light output surface of the light guide plate and a light exit surface opposite to the light entrance surface. The optical film has a plurality of transparent film cells extending from the light entrance surface to the light exit surface. Each film cell has light-reflecting layers provided on at least a part of side surfaces thereof extending from the light entrance surface to the light exit surface.

Specifically, the lighting device may be arranged such that each film cell of the optical film has a regular polygonal cross-sectional configuration, and one of diagonal lines connecting a pair of diagonally opposing vertices of the polygon is parallel to the direction of light directed to be received through the light input surface of the light guide plate.

The optical film or the lighting device according to the present invention enables the directivity of the lighting device to increase. As a result, it becomes possible to increase the brightness of the lighting device.

The above and other objects, features and advantages of the present invention will become more apparent from the following description of the preferred embodiments thereof, taken in conjunction with the accompanying drawings.

DESCRIPTION OF THE PREFERRED EMBODIMENTS

FIGS. 1A to 3 are illustrations explaining an optical film according to a first embodiment of the present invention and a lighting device with the optical film.

Figure 1A:
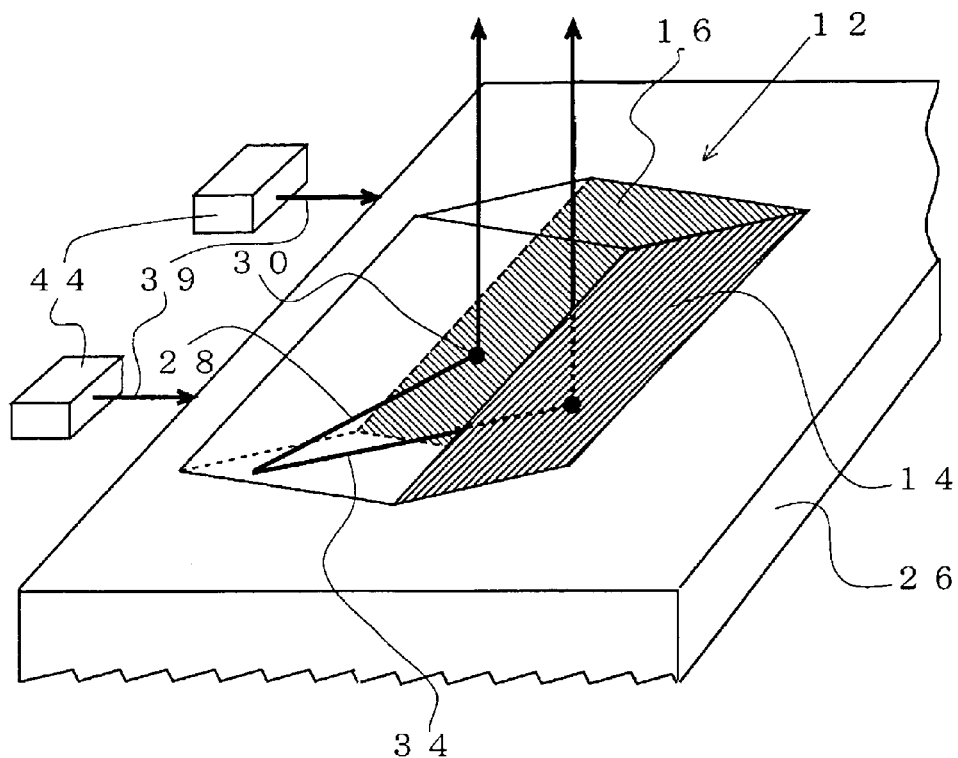
FIG. 1A is a view showing the course of light in one cell of an optical film disposed above a light guide plate.
Figure 1B:
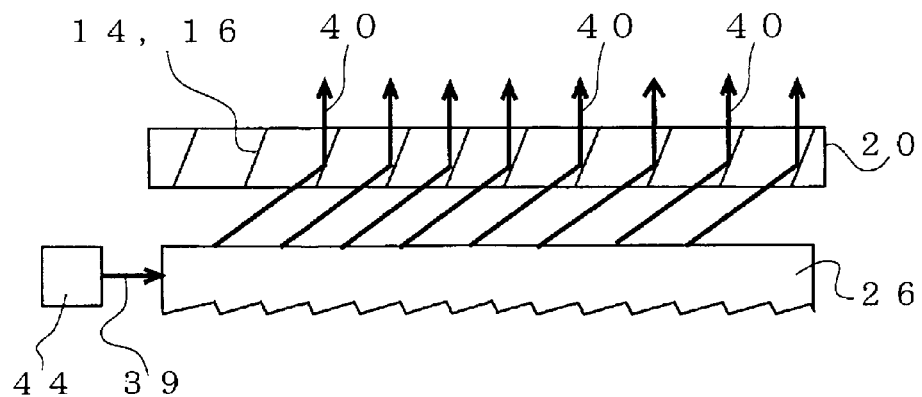
FIG. 1B is a view showing the course of light in a section of a lighting device.

As shown in FIG. 1B, the lighting device according to the present invention has LED light sources 44, a light guide plate 26, and an optical film 20 that directs light (not shown) exiting the light guide plate 26 to a display, as in the case of the above-described conventional lighting device.

Figure 2A:
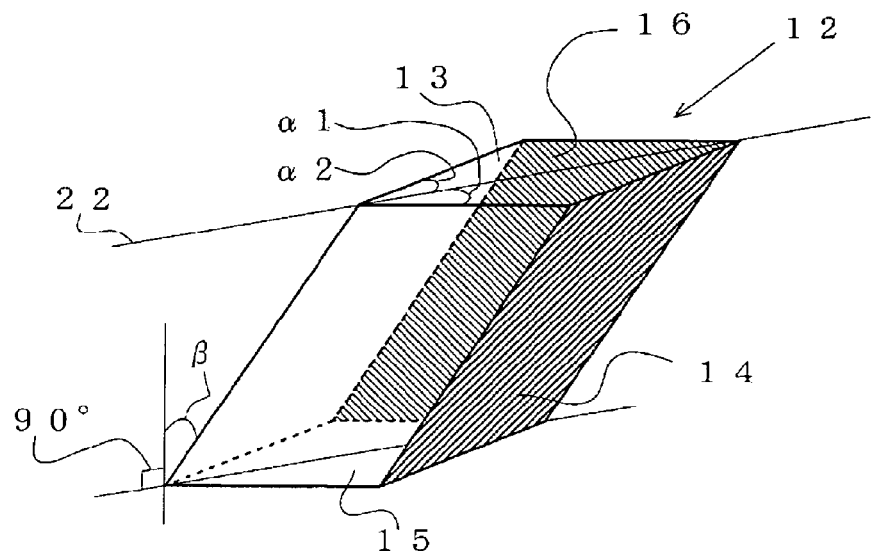
FIG. 2A is an illustration explaining a cell of an optical film according to a first embodiment of the present invention.
Figure 2B:
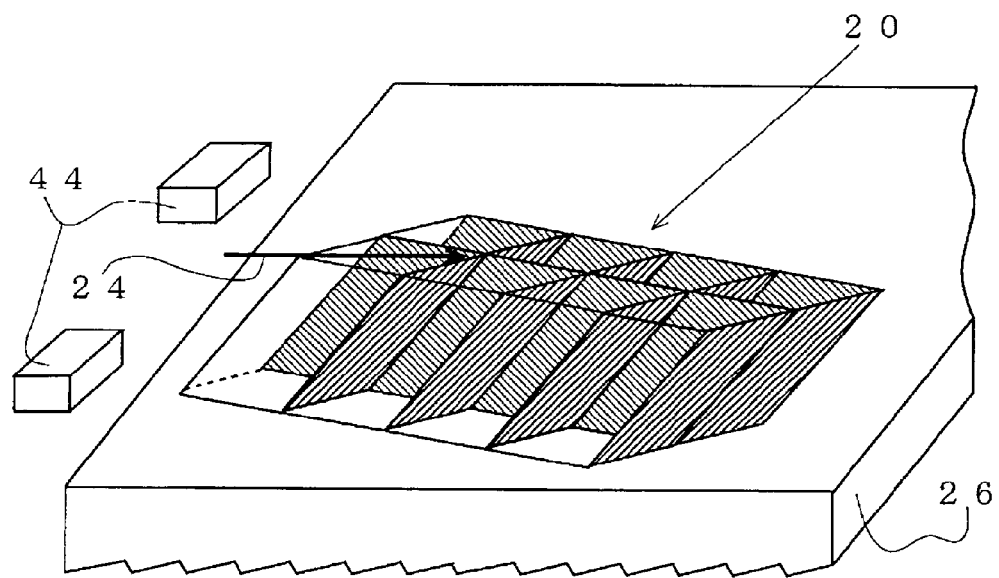
FIG. 2B is an illustration explaining the optical film as used in a lighting device according to the first embodiment of the present invention.

The optical film 20 comprises a plurality of cells 12, as partly shown in FIG. 2B. Each cell 12 is, as shown in FIG. 2A, in the shape of a tilted prism having a parallelogram or rhombic top and bottom surfaces 13 and 15 and four side surfaces. The cell 12 is positioned so that a diagonal line 22 connecting a pair of diagonally opposing vertices of the top surface 13 or the bottom surface 15 in FIG. 2A is coincident with the direction 24 of light directed to the light guide plate 26 from the light sources 44.

Each cell 12 has light-reflecting layers 14 and 16 provided on two side surfaces thereof which are adjacent to each other and positioned on both sides of the diagonal line 22. It is preferable that the inside surfaces of the light-reflecting layers 14 and 16 are oriented generally in a direction toward the light source side. Any substance of high optical reflectivity may be used as a material constituting the light-reflecting layers 14 and 16. It is, however, preferable to use a substance that reflects substantially all light wavelengths, such as silver, from the viewpoint of the color of reflected light. Each cell 12 is tilted at an angle β, as shown in FIG. 2B, in the direction of the line 22 connecting a pair of diagonally opposing vertices of each of the top and bottom surfaces 13 and 15. The value of the angle β is set in consideration of the refractive index, height and light exit direction of the film cells 12. Usually, the light exit direction is perpendicular to the plane of the light guide plate 26. In automotive navigation systems, etc., however, the light exit direction may be set at an angle not perpendicular to the plane of the light guide plate 26.

The plurality of cells 12 are interconnected in a mesh pattern in a plan view so that the respective cells 12 are surrounded by the reflecting layers. The top surfaces 13 and the bottom surfaces 15 of the cells 12 are lying in a pair of parallel planes, respectively, to form the upper and lower surfaces of the optical film 20. The optical film 20 is placed in close proximity to the light exit surface of the light guide plate 26. It should be noted that in FIG. 2B the optical film 20 is shown to partly cover the light guide plate 26 for the sake of simplicity. In actuality, the optical film 20 is placed to cover substantially the whole light guide plate 26.

Figure 3:
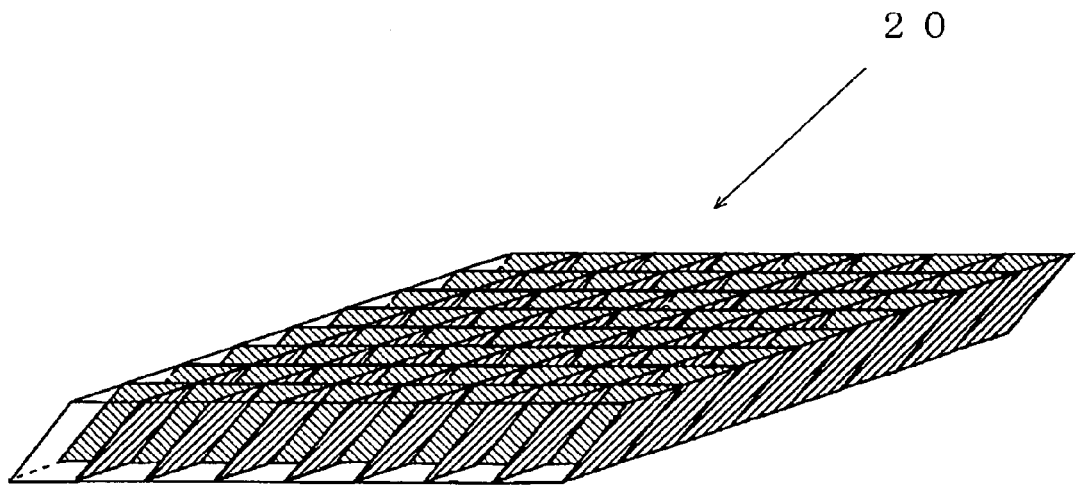
FIG. 3 is a view showing the optical film according to the present invention.

In production of the optical film 20, as shown for example in FIG. 3, a large-sized sheet having a plurality of cells interconnected as stated above is formed. Then, the sheet is cut to the size of the light guide plate actually used in combination with the optical film 20.

FIG. 1A shows the course of light when only one cell 12 is placed over the light guide plate 26 for simplicity to explain the operation of the optical film 20.

In FIG. 1A, light 39 from the light sources 44, comprising LEDs or the like, enters the light guide plate 26 and exits from the top surface of the light guide plate 26. Thereafter, the light enters the cell 12. The light 39 from the light sources 44 diverges from the rectilinear propagation direction. As has been stated above, light diverging in the lateral direction, in particular, tends to diverge from the direction perpendicular to the display (i.e. to diverge from the upward direction substantially perpendicular to the light exit surface of the light guide plate 26). Even such laterally diverging light is reflected by the light-reflecting layers 14 and 16 when entering the cell 12 of the optical film 20, and directs in an upward direction substantially perpendicular to the light exit surface of the light guide plate 26.

In other words, the directivity of illuminating light in the YZ plane can be controlled by adjusting the tilt angle β (FIG. 2A) of the cells 12, and the light directivity in the XY plane can be controlled with the angles $\alpha_1$ and $\alpha_2$ (FIG. 2A) between the light-reflecting layers 14 and 16 on the one hand and, on the other hand, the line connecting a pair of diagonally opposing vertices of the polygon forming the top and bottom surfaces 13 and 15 of each cell, which is parallel to light 39 entering the light guide plate 26 from the light sources 44.

Figure 8A:
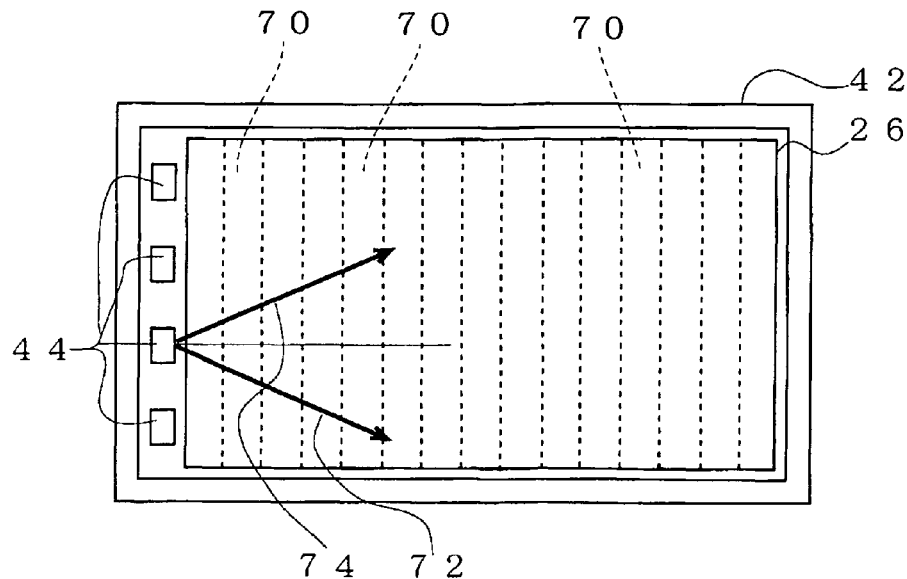
FIG. 8A is a plan view of a conventional lighting device.
Figure 8B:
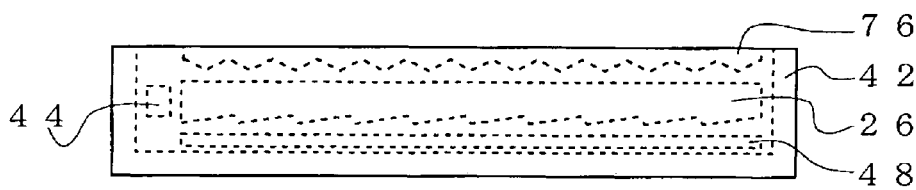
FIG. 8B is a side view of the conventional lighting device.
Figure 8C:
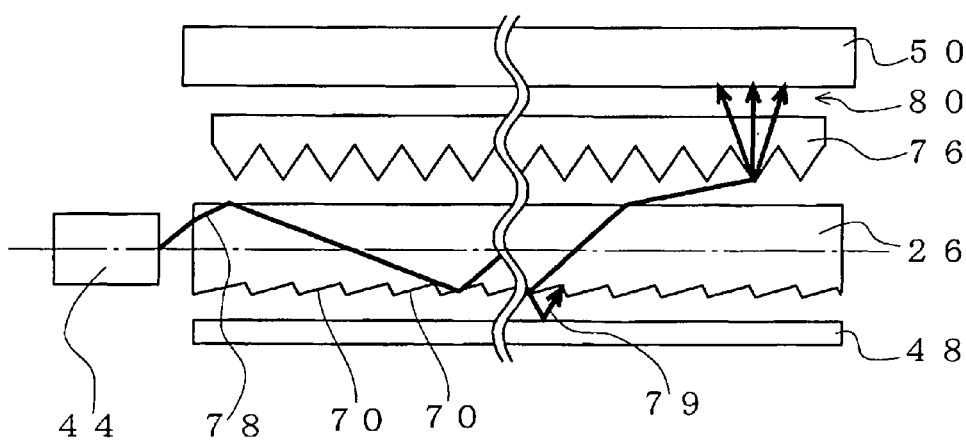
FIG. 8C is a sectional view for explaining the course of light in the conventional lighting device.

The lighting device of the present invention has improved directivity, particularly in the XY plane. In the conventional lighting device, as shown in FIG. 8A, many light components 72 and 74 from the LED light sources 44 are incident obliquely on the reflecting prisms 70. Consequently, illuminating light from the lighting device is undesirably scattered, as indicated by reference numeral 80 in FIG. 8C. In this regard, the present invention enables such obliquely incident light to travel in an upward direction substantially perpendicular to the light exit surface of the light guide plate 26 by the action of the light-reflecting layers 16 and 14 having the angles $\alpha_1$ and $\alpha_2$. Accordingly, the directivity in the XY plane can be increased.

FIG. 1B shows the course of illuminating light as viewed in a section of the lighting device. Light emitted from the LED light sources 44 enters the light guide plate 26 and exits obliquely upward from the top surface (light exit surface) of the light guide plate 26. The exiting light enters each cell of the optical film 20 and is reflected by the light-reflecting layers 14 and 16 to become light 40 in a substantially normal direction to the light exit surface of the light guide plate 26 to illuminate a non self-emission display, e.g. a liquid crystal display, which is placed directly above the optical film 20.

It should be noted that the light sources 44, the light guide plate 26 and the optical film 20 are basic constituent elements of the lighting device according to the present invention. In this arrangement of the present invention, a diffusing sheet or other similar film may be provided between the light guide plate 26 and the optical film 20 or directly above the optical film 20, i.e. outside the combination of the light guide plate 26 and the optical film 20, to control the optical characteristics of the lighting device. The structure of the present invention may be modified to allow illuminating light to exit downward from the light guide plate 26 as well, thereby constructing a lighting device with a double-sided display.

Figure 4A:
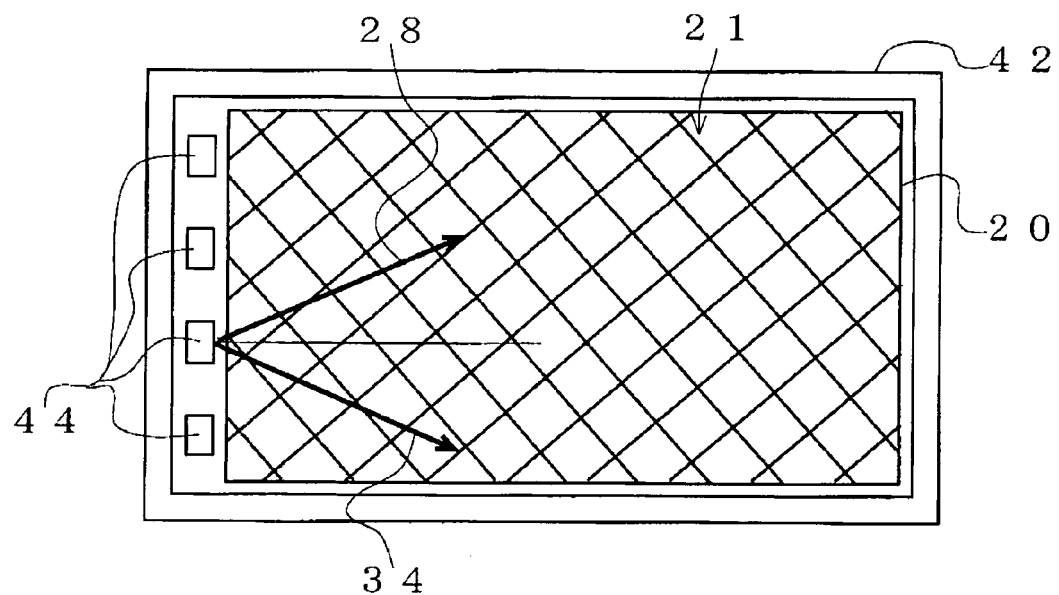
FIG. 4A is a plan view of the lighting device according to the present invention.
Figure 4B:
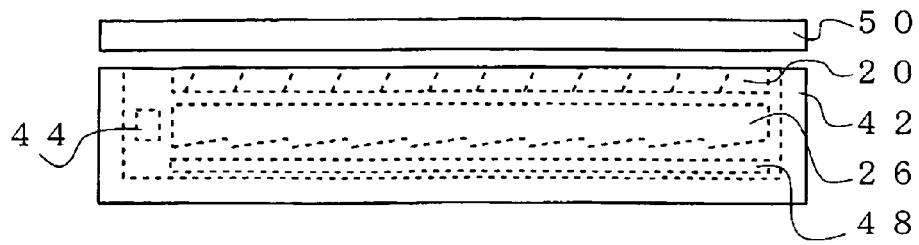
FIG. 4B is a side view of the lighting device according to the present invention.
Figure 4C:
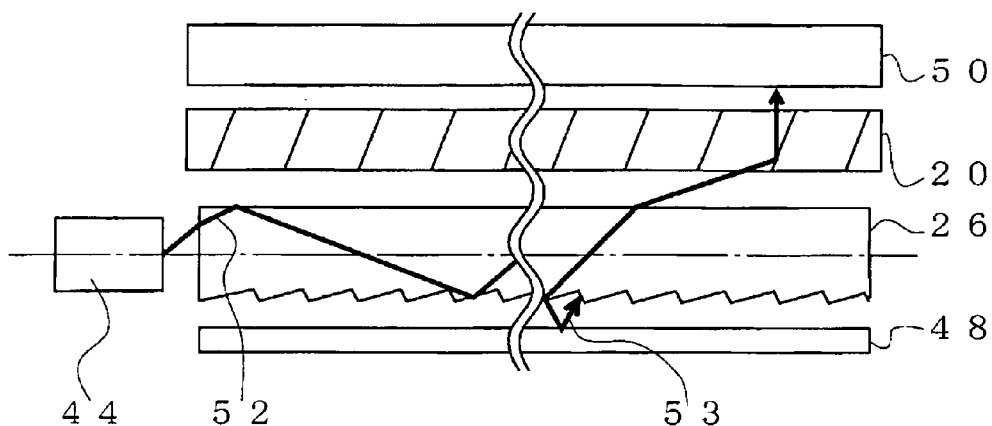
FIG. 4C is a sectional view for explaining the course of light in the lighting device according to the present invention.

FIGS. 4A to 4C show a structural example of a side-light type lighting device according to the present invention. FIG. 4A is a plan view, and FIG. 4B is a side view. FIG. 4C is a sectional view illustrating the trace of illuminating light.

In this lighting device, as shown in FIG. 4A, a plurality of LED light sources 44 are disposed at a side edge of a rectangular light guide plate 26, so that light emitted from the LED light sources 44 enters the light guide plate 26. The light guide plate 26 has microprisms, i.e. reflecting prisms, formed on the bottom surface thereof to provide a light-reflecting surface. As shown in FIG. 4B, a reflecting sheet 48 is disposed under the bottom of the rectangular light guide plate 26, and an optical film 20 is disposed over the top of the light guide plate 26. The light guide plate 26, the reflecting sheet 48 and the optical film 20 are housed in a holder 42 to illuminate a non self-emission display 50, e.g. a liquid crystal display, which is placed directly above the holder 42.

FIG. 4C shows the path of light traveling in the lighting device having the above-described structure. Light 52 emitted from the LED light sources 44 enters the light guide plate 26 in which it is propagated while repeating bouncing between the top surface of the light guide plate 26 and the microprism surface provided on the bottom of the light guide plate 26. As the light 52 repeats bouncing, the incident angle of the light on the top surface of the light guide plate 26 decreases and eventually becomes smaller than the critical angle. Consequently, light exits from the top surface of the light guide plate 26. Light 53 undesirably exiting from the bottom surface of the light guide plate 26 is reflected by the reflecting sheet 48 back to the light guide plate 26. The light exiting from the light guide plate 26 is refracted by the optical film 20 and led to the display 50.

The mesh pattern 21 shown in FIG. 4A indicates the light-reflecting layers 14 and 16 of the optical film 20. As has been stated above, light components 28 and 34 emitted from the LED light sources 44 enter the cells 12 of the optical film 20 after exiting the top surface of the light guide plate 26. Then, the light components 28 and 34 are reflected by the light-reflecting layers 14 and 16 to exit upward as illuminating light. The divergence of light exiting each cell can be minimized to increase the directivity by adjusting the angles $\alpha_1$ and $\alpha_2$.

Figure 5:
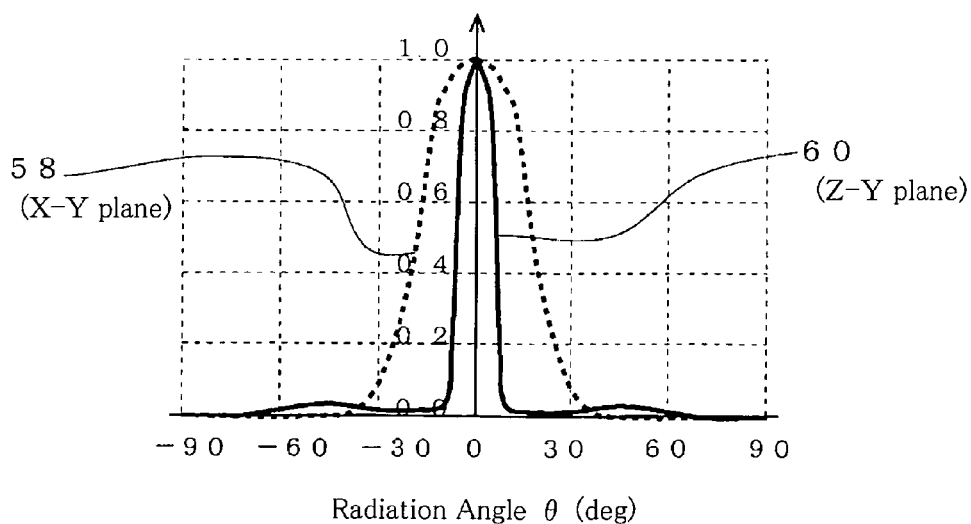
FIG. 5 is a graph showing optical characteristics of the lighting device according to the present invention.
Figure 9A:
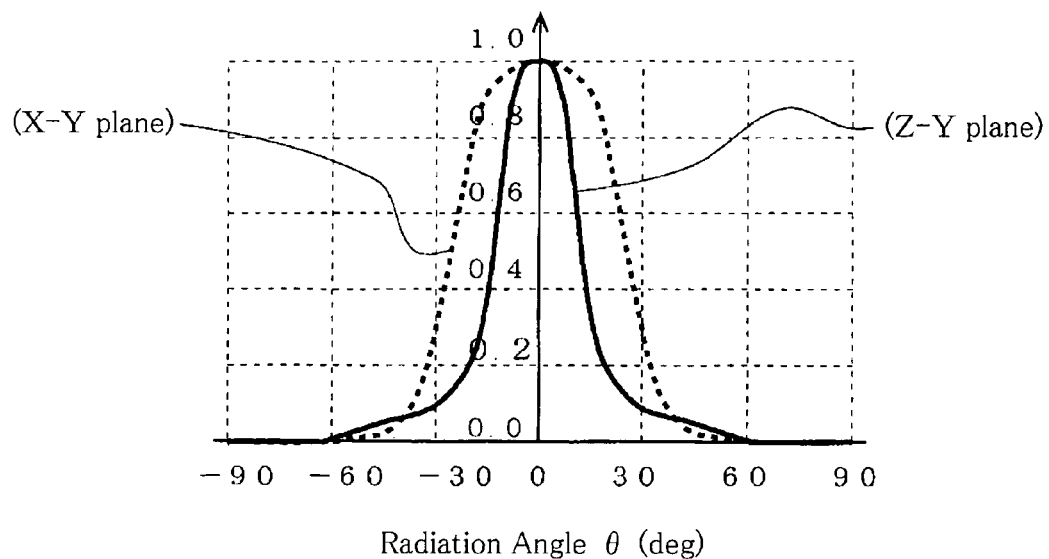
FIG. 9A is a graph showing optical characteristics of the conventional lighting device.
Figure 9B:
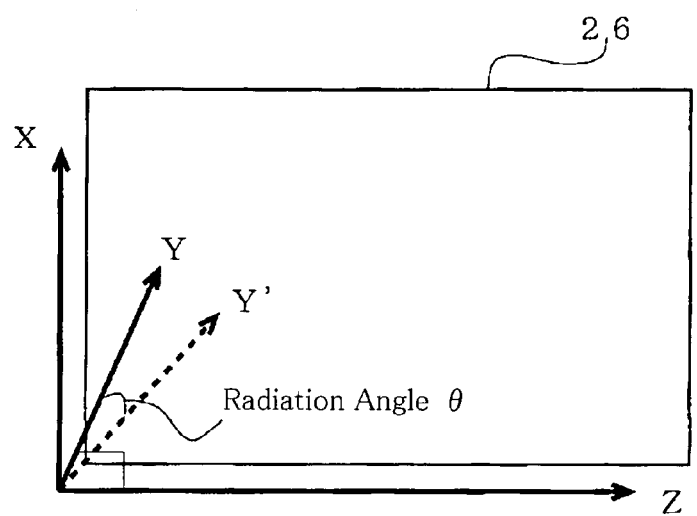
FIG. 9B is a view for explaining coordinate axes used in the specification of the present invention.
Figure 10A:
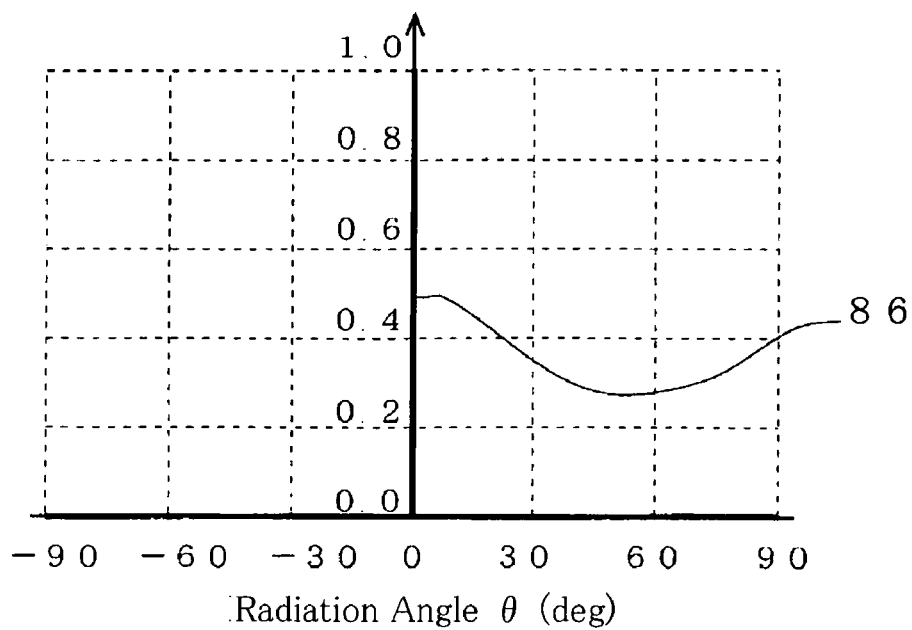
FIG. 10A is a view for explaining optical characteristics.
Figure 10B:
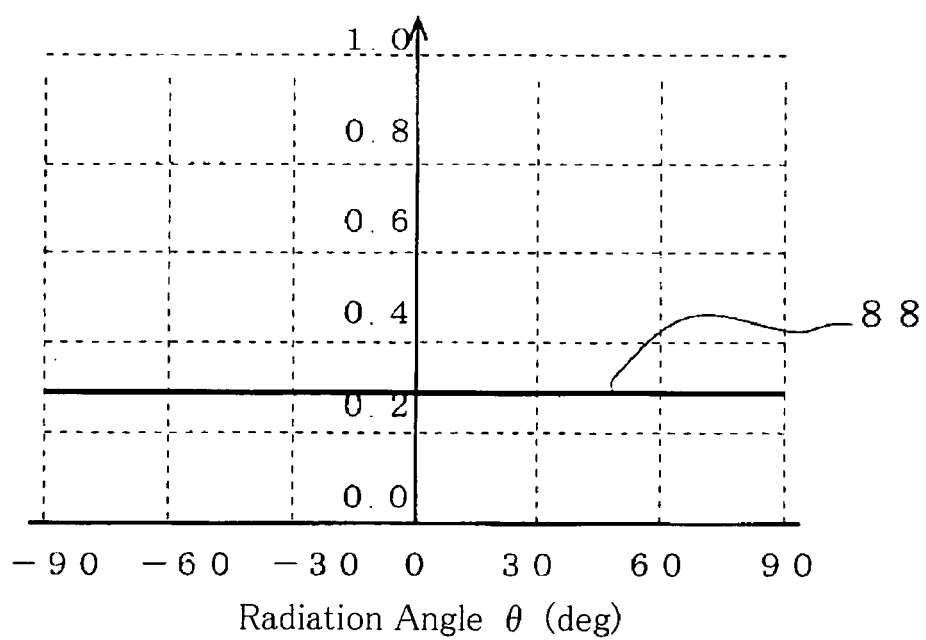
FIG. 10B is a view for explaining optical characteristics.

With the above-described arrangement, the lighting device according to the present invention provides optical characteristics as shown in FIG. 5. It should be noted that the coordinate axes in FIG. 5 are the same as those explained in connection with FIG. 9B.

As shown in the graph of FIG. 5, the lighting device of the present invention provides favorable optical characteristics. Regarding both the characteristics 58 in the X-Y plane and the characteristics 60 in the Z-Y plane, light is more converged to a direction perpendicular to the surface of the light guide plate 26 than in the conventional lighting device. For example, in the X-Y plane, light in the angle direction of 30° from the direction perpendicular to the surface of the light guide plate 26 has an about 10% intensity of light in the perpendicular direction. In the Z-Y plane, light in the angle direction of 30° from the direction perpendicular to the surface of the light guide plate 26 has an about several percent intensity of light in the perpendicular direction. That is, the directivity in the X-Y direction, which is the width direction, has particularly increased. Thus, the lighting device of the present invention has been improved in directivity of light.

Figure 6A:
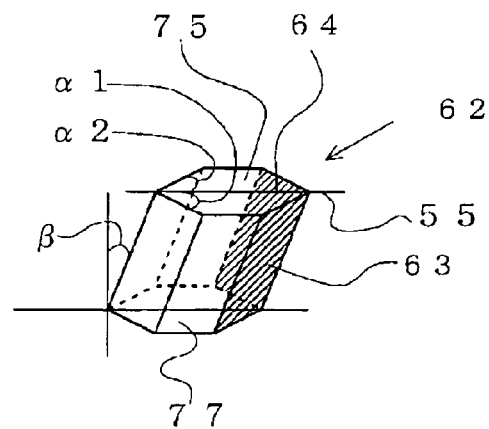
FIG. 6A is an illustration explaining a cell of an optical film according to a second embodiment of the present invention.
Figure 6B:
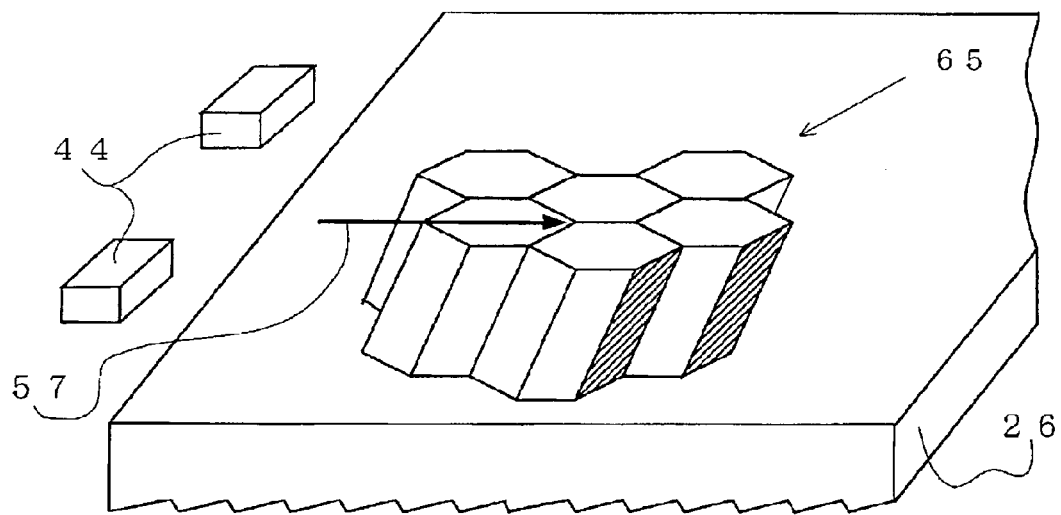
FIG. 6B is an illustration explaining the optical film as used in a lighting device according to the second embodiment of the present invention.

FIGS. 6A and 6B show a second embodiment of the lighting device according to the present invention.

A transparent film cell 62 shown in FIG. 6A differs from the transparent film cell 12 in that the film cell 62 has hexagonal top and bottom surfaces 75 and 77, and two side surfaces of a total of 8 faces of the film cell 62 are provided with light-reflecting layers 63 and 64, which are shown by the oblique lines in the figure.

The transparent film cell 62 is in the shape of a prism. The film cell 62 is tilted at an angle β in the direction of a line 55 connecting a pair of diagonally opposing vertices of each of the top and bottom surfaces 75 and 77 in the same way as the cell 12.

FIG. 6B shows a part of an optical film 65 comprising a plurality of film cells 62. The film cells 62 are interconnected in a mesh pattern in a plan view in such a manner that the top surfaces 75 and the bottom surfaces 77 of the cells 62 are lying in a pair of parallel planes, respectively. The optical film 65 is placed in close proximity to the top surface of the light guide plate 26. The optical film 65 is positioned so that the light direction 57 to the light guide plate 26 from the LED light sources 44 is parallel to the line 55.

The optical film 65 is formed in the shape of a large-sized sheet as shown in FIG. 3, and the sheet is cut to the size of the light guide plate actually used in combination with the optical film 65, in the same way as the foregoing optical film 20.

The above-described structure also makes it possible to obtain the same advantageous effects as in the case of the lighting device shown in FIG. 2.

Thus, various configurations are selectable for the top and bottom surfaces of the optical film cells. That is, any polygonal configuration having three or more angles may be selected. The number of side surfaces to be provided with light-reflecting layers is not necessarily limited to 2. A plurality of surfaces may be selected to be provided with light-reflecting layers.

Figure 7A:
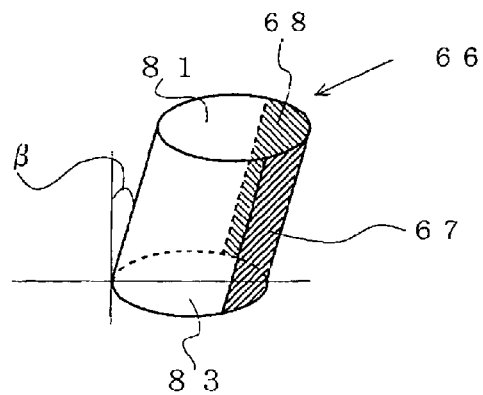
FIG. 7A is an illustration explaining a cell of an optical film according to a third embodiment of the present invention.
Figure 7B:
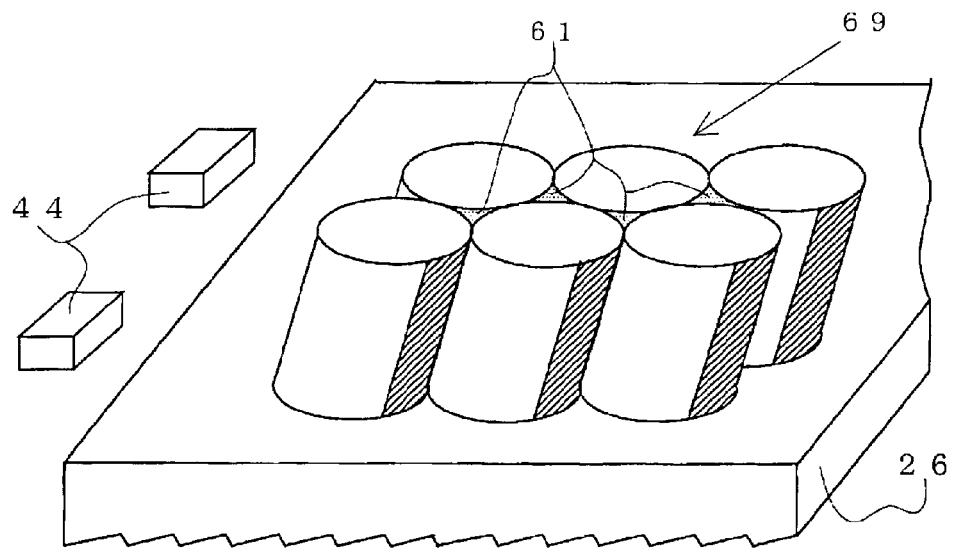
FIG. 7B is an illustration explaining the optical film as used in a lighting device according to the third embodiment of the present invention.

FIGS. 7A and 7B show a third embodiment of the lighting device according to the present invention.

A film cell 66 in this embodiment differs from the cell 12 shown in FIG. 2A in that the film cell 66 has elliptical or circular top and bottom surfaces 81 and 83, and a part of the side surface of the film cell 66 is provided with light-reflecting layers 67 and 68, which are shown by the oblique lines in FIG. 7A. As shown in the figure, the film cell 66 having a circular cylinder shape is tilted at an angle β in the same way as the film cell 12.

FIG. 7B shows a part of an optical film 69 comprising a plurality of film cells 66. The film cells 66 are interconnected with a transparent resin 61, for example, in a mesh pattern in a plan view in such a manner that the top surfaces 81 and the bottom surfaces 83 of the cells 66 are lying in a pair of parallel planes, respectively. The optical film 69 is placed in close proximity to the illuminating light exit surface of the light guide plate 26.

The optical film 69 is formed in the shape of a large-sized sheet as shown in FIG. 3, and the sheet is cut to the size of the light guide plate actually used in combination with the optical film 69, in the same way as the foregoing optical film 20.

The above-described structure also makes it possible to expect the same advantageous effects as in the case of the lighting device shown in FIG. 2.

Thus, various configurations, including polygonal and elliptical configurations, are selectable for the top and bottom surfaces of the optical film cells. In addition, a region of a side surface to be provided with a light-reflecting layer can be set freely.

It should be noted that optical films such as those stated in connection with the first, second and third embodiments can be obtained as follows. A large number of columnar members formed of a transparent material with a polygonal, elliptical or circular cross-sectional configuration are arranged in such a manner that their side surfaces contact each other, and bonded together with a transparent adhesive to form a sheet. The sheet is sliced in a direction at an angle β (shown in FIGS. 2, 5 and 6) to the longitudinal axes of the columnar members.

Although in this specification the present invention has been explained with regard to a lighting device using LED light sources by way of example, it should be noted that the optical film according to the present invention may be incorporated in lighting devices using other light sources, e.g. a cold-cathode tube.

As has been stated above, the present invention makes it possible to increase the directivity of the lighting device and hence possible to increase the brightness of the lighting device.

It should be noted that the present invention is not necessarily limited to the foregoing embodiments but can be modified in a variety of ways without departing from the gist of the present invention.

What is claimed is:

1. An optical film having a light entrance surface and a light exit surface that are opposite to each other, the optical film comprising:
   a plurality of transparent film cells extending from the light entrance surface to the light exit surface,
   a cross-sectional configuration of each film cell parallel to the light entrance surface and the light exit surface being selected from the group consisting of polygon, circle, and ellipse, and the plurality of film cells being arranged to contact each other to form a mesh pattern in a plan view; and
   light-reflecting layers provided on peripheral side surfaces of the film cells extending from the light entrance surface to the light exit surface, at least some of the film cells being surrounded by the light-reflecting layers.

2. An optical film having a light entrance surface and a light exit surface that are opposite each other, the optical film comprising:
   a plurality of transparent film cells extending from the light entrance surface to the light exit surface, a cross-sectional configuration of each film cell parallel to the light entrance surface and the light exit surface being selected from the group comprising a polygon, circle and ellipse; and
   a light-reflecting layer provided on a peripheral side surface of each film cell extending from the light entrance surface to the light exit surface.

3. The optical film according to claim 2, wherein the plurality of film cells are arranged to contact each other.

4. The optical film according to claim 3, wherein the peripheral side surfaces of the plurality of film cells are tilted at a predetermined angle relative to the light entrance surface and the light exit surface.

5. A lighting device comprising:
   a light guide plate having a reflecting surface and a light output surface that are opposite to each other, and a peripheral edge surface extending between respective peripheral edges of the reflecting surface and the light output surface, the peripheral edge surface including a light input surface that receives light into the light guide plate so that the light bounces inside the light guide plate and eventually exits from the light output surface; and
   an optical film having a light entrance surface disposed adjacent to the light output surface of the light guide plate and a light exit surface opposite to the light entrance surface, the optical film having a plurality of transparent film cells extending from the light entrance surface to the light exit surface, each film cell having a light-reflecting layer provided on a peripheral side surfaces thereof extending from the light entrance surface to the light exit surface, a cross-sectional configuration of each film cell parallel to the light entrance surface and the light exit surface being selected from the group consisting of a polygon, circle, and ellipse, and the plurality of film cells being arranged to be in contact with each other to form a mesh pattern in a plan view, at least some of the film cells being surrounded by the light-reflecting layers.

6. The lighting device according to claim 5, wherein the peripheral side surfaces of the plurality of film cells are tilted at a predetermined angle relative to the light entrance surface and the light exit surface.

7. A lighting device according to claim 5, wherein each film cell of the optical film has a cross-sectional configuration in a shape of a regular polygon, the cross-sectional configuration is parallel to the light entrance surface and the light exit surface, and a line connecting a pair of diagonally opposing vertices of the polygon is parallel to a direction of light directed to be received through the peripheral edge surface of the light guide plate.

8. The optical film according to claim 1, wherein light entering the light entrance surface is reflected by the light-reflecting layers and directed in a direction substantially perpendicular to the light entrance surface.

9. The optical film according to claim 8, wherein the light entering the light entrance surface comprises laterally divergent light relative to the light entrance surface.

10. The optical film according to claim 2, wherein the plurality of transparent film cells comprise tilted prisms.

11. The optical film according to claim 2, wherein the plurality of transparent film cells are arranged in a mesh pattern in a plan view so that at least some of the film cells are surrounded by the light-reflecting layers.

12. The lighting device according to claim 5, wherein the light guide plate comprises a 3-dimensional structure.

13. The lighting device according to claim 5, wherein laterally diverging light relative to the light output surface of the light guide plate is reflected by the light-reflecting layers and directed in a direction substantially perpendicular to the light output surface of the light guide plate.

14. The lighting device according to claim 2, wherein the plurality of transparent film cells comprise tilted prisms.

15. The lighting device according to claim 2, wherein said plurality of transparent film cells are arranged in a mesh pattern in a plan view so that at least some of the film cells are surrounded by the light-reflecting layers.

* * * * *

UNITED STATES PATENT AND TRADEMARK OFFICE
CERTIFICATE OF CORRECTION

PATENT NO. : 7,547,468 B2 Page 1 of 1
APPLICATION NO. : 11/580428
DATED : June 16, 2009
INVENTOR(S) : Junji Miyashita It is certified that error appears in the above-identified patent and that said Letters Patent is hereby corrected as shown below:

<u>On the Title Page</u>

In column 1, line 73, under "Assignee:", after "Citizens Electronics Co., Ltd., Yamanashi-Ken (JP)", insert --Hitachi Chemical Company, Ltd., Tokyo (JP)--.

Signed and Sealed this

Twenty-sixth Day of January, 2010

David J. Kappos
*Director of the United States Patent and Trademark Office*